United States Patent
Jung et al.

(10) Patent No.: US 10,174,903 B2
(45) Date of Patent: Jan. 8, 2019

(54) LAMP FOR VEHICLE

(71) Applicant: SL Corporation, Daegu (KR)

(72) Inventors: Myong Guan Jung, Gyeongsanbu-do (KR); Jin Young Jung, Gyeongsanbu-do (KR); Woo Yeung Son, Gyeongsanbu-do (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 15/357,726

(22) Filed: Nov. 21, 2016

(65) Prior Publication Data

US 2017/0144589 A1    May 25, 2017

(30) Foreign Application Priority Data

Nov. 20, 2015  (KR) .................. 10-2015-0162915
Dec. 28, 2015  (KR) .................. 10-2015-0187251

(51) Int. Cl.
*F21S 41/32*    (2018.01)
*F21S 43/20*    (2018.01)
(Continued)

(52) U.S. Cl.
CPC ............ *F21S 43/26* (2018.01); *B60Q 1/0041* (2013.01); *F21S 41/143* (2018.01); *F21S 41/265* (2018.01);
(Continued)

(58) Field of Classification Search
CPC ....... B60Q 1/24; B60Q 1/0041–1/0052; B60Q 1/04; B60Q 1/14; F21S 43/20–43/27;
(Continued)

(56) References Cited

U.S. PATENT DOCUMENTS 6,536,923 B1 *  3/2003  Merz .................... F21V 7/0091
                                                          362/327
8,690,405 B2 *  4/2014  Sekiguchi ............... F21V 13/12
                                                          362/514
(Continued)

FOREIGN PATENT DOCUMENTS

JP    2014060047 A    4/2014
JP    2015115165 A    6/2015
(Continued)

*Primary Examiner* — Mariceli Santiago
(74) *Attorney, Agent, or Firm* — Mintz Levin Cohn Ferris Glovsky and Popeo, P.C.; Kongsik Kim; Jhongwoo Jay Peck

(57) ABSTRACT

A lamp for a vehicle that radiates a beam pattern to a vehicle front side is provided. The lamp for a vehicle includes at least one light source and a lens configured to radiate a low beam to a front side of the vehicle through refraction of light emitted from the at least one light source. The lens includes a light incident portion that light emitted from the light source is incident and a light exit portion from that refracts and exits the light. The light exit portion includes a plurality of facets formed to have independent curvatures to refract the light from the light source and to form a beam pattern of the low beam. The portions of the plurality of facets are inclined with respect to a virtual vertical line having at least portions of boundary lines formed between the inclined facets and the neighboring facets.

14 Claims, 19 Drawing Sheets

(51) Int. Cl.
- *B60Q 1/00* (2006.01)
- *F21S 43/31* (2018.01)
- *F21S 41/275* (2018.01)
- *F21S 43/40* (2018.01)
- *F21S 41/143* (2018.01)
- *F21S 43/235* (2018.01)
- *F21S 41/265* (2018.01)
- *F21S 43/14* (2018.01)
- *F21S 41/663* (2018.01)
- *F21S 43/50* (2018.01)
- *F21S 41/50* (2018.01)

(52) U.S. Cl.
CPC ........... *F21S 41/275* (2018.01); *F21S 41/322* (2018.01); *F21S 41/663* (2018.01); *F21S 43/14* (2018.01); *F21S 43/235* (2018.01); *F21S 43/315* (2018.01); *F21S 43/40* (2018.01); *F21S 41/50* (2018.01); *F21S 43/50* (2018.01)

(58) Field of Classification Search
CPC ........ F21S 41/20–41/295; F21S 41/151; F21S 41/322; F21W 2102/13–2102/165
See application file for complete search history.

(56) References Cited

U.S. PATENT DOCUMENTS

| | | | |
|---|---|---|---|
| 2007/0086202 A1* | 4/2007 | Tsukamoto | F21S 41/147 362/514 |
| 2009/0196060 A1* | 8/2009 | Sazuka | B60Q 1/14 362/509 |
| 2011/0205748 A1* | 8/2011 | Yatsuda | F21S 41/147 362/517 |

FOREIGN PATENT DOCUMENTS

| | | |
|---|---|---|
| KR | 20140039609 A | 4/2014 |
| KR | 20150071404 A | 6/2015 |

\* cited by examiner

LAMP FOR VEHICLE

CROSS-REFERENCE TO RELATED APPLICATIONS

This application claims priority to Korean Patent Application No. 10-2015-0162915 filed on Nov. 20, 2015 and Korean Patent Application No. 10-2015-0187251 filed on Dec. 28, 2015. The applications are incorporated herein in their entirety by reference.

BACKGROUND

1. Field of the Disclosure

The present disclosure relates to a lamp for a vehicle, and more particularly to a lamp for a vehicle, configured to radiate a beam pattern to a front side of the vehicle.

2. Description of the Prior Art

Generally, a vehicle is provided with various types of vehicle lamps which have an illumination function for easily confirming target objects disposed proximate to the vehicle during low light conditions (e.g., night driving) and a signal function for notifying other vehicles or road users of vehicle driving states. For example, head lamps disposed on a front portion of a vehicle may include low-beam, high-beam, turn-signal, and position lamps or a Daytime Running Light (DRL). In order to fully show functions of the respective lamps, the installation bases and standards of the respective lamps have been prescribed by laws and regulations. Further, the lenses of the respective lamps have been separately designed so that the respective lamps radiate beam patterns that satisfy the laws and regulations.

In particular, a low beam is formed below a predetermined cutoff line to prevent disturbance of the visual field of a driver of the oncoming vehicle. Further, in order to form a beam pattern in which a cutoff line is formed, a method for implementing a cutoff line has been used to obstruct a portion of light that is emitted from a light source using a shield disposed between the light source and the lens.

The above information disclosed in this section is merely for enhancement of understanding of the background of the disclosure and therefore it may contain information that does not form the prior art that is already known in this country to a person of ordinary skill in the art.

SUMMARY

A lamp for a vehicle that forms a low-beam pattern having a cutoff line without using a shield is provided. In one aspect of the present disclosure, a lamp for a vehicle, may include at least one light source and a lens configured to radiate a low beam to a front side of the vehicle through refraction of light emitted from the at least one light source. The lens may include a light incident portion to which light that is emitted from the light source is incident and a light exit portion from which the light that is incident to the lens is refracted and exits. The light exit portion may include a plurality of facets that are formed to have independent curvatures to refract the light emitted from the light source and to form a beam pattern of the low beam. The portions of the plurality of facets may be inclined facets in which at least portions of boundary lines that are formed between the inclined facets and the neighboring facets are formed to be inclined with respect to a virtual vertical line.

In another aspect of the present disclosure, a lamp for a vehicle may include at least one light source and a lens configured to refract light that is emitted from the at least one light source and to radiate the refracted light to a front side of the vehicle. The at least one light source may include a first light source and a second light source. The lens may be configured to refract light that exits from the first light source and light that exits from the second light source and radiates the refracted light to the front side of the vehicle. The lens may include a light incident portion to which the light emitted from the first light source and the second light source is incident and a light exit portion from which the light of the first light source and the second light source, which is incident to the lens through the light incident portion, is refracted and exits. The light exit portion may include a plurality of facets having independent curvatures. The plurality of facets form a main beam pattern through refraction of the light emitted from the first light source.

According to the embodiments of the present disclosure, at least the following effects may be achieved. A low-beam pattern in which a cutoff line is formed may be formed without using a shield.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Figure 1:
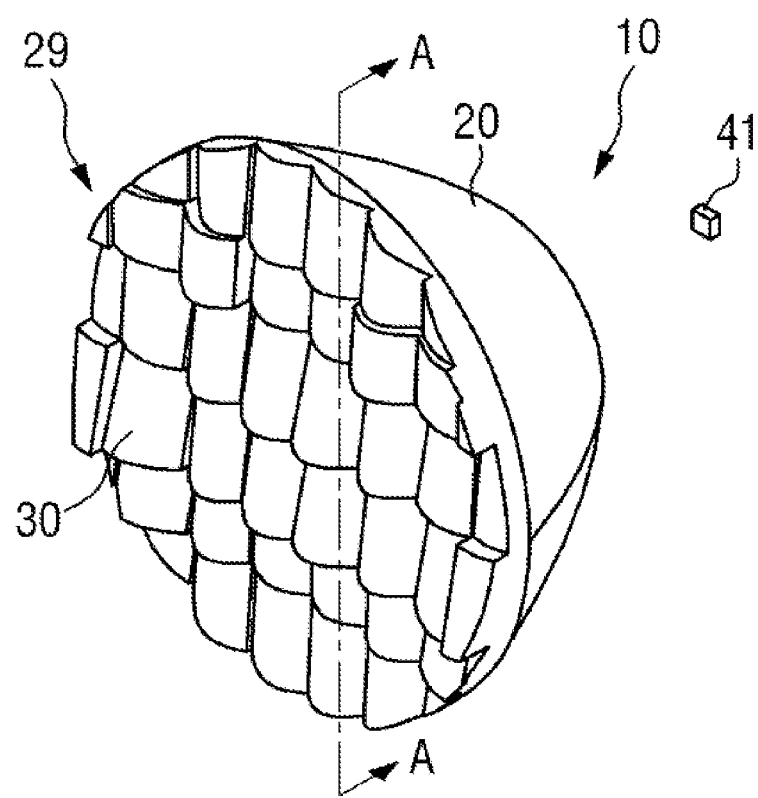
FIG. 1 is an exemplary perspective view illustrating a lens of a lamp for a vehicle according to an exemplary embodiment of the present disclosure.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but may be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

In the following description of the present disclosure, embodiments of the present disclosure will be described with reference to sectional views and/or schematic views which are ideal exemplary views. Accordingly, the form of exemplary views may be modified due to the manufacturing techniques and/or allowable errors. Further, in the drawings, sizes and relative sizes of layers and areas may be exaggerated for convenience in explanation. In the entire description of the present disclosure, the same drawing reference numerals are used for the same elements across various figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles Hereinafter, a lamp for a vehicle according to the present disclosure will be described with reference to the accompanying drawings explaining a lamp for a vehicle according to an embodiment of the present disclosure.

Figure 2:
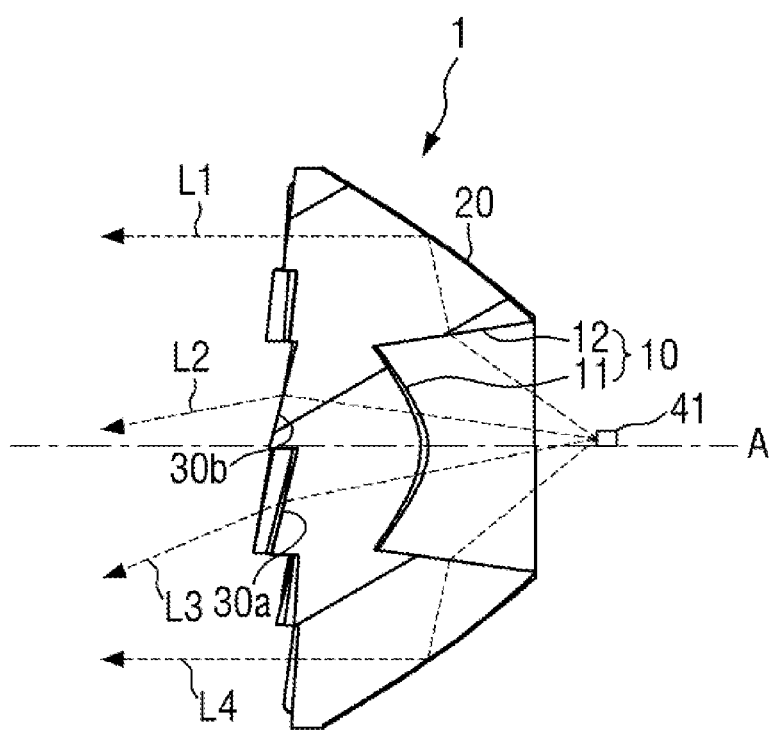
FIG. 2 is an exemplary schematic cross-sectional view taken along line A-A in FIG. 1.
Figure 3:
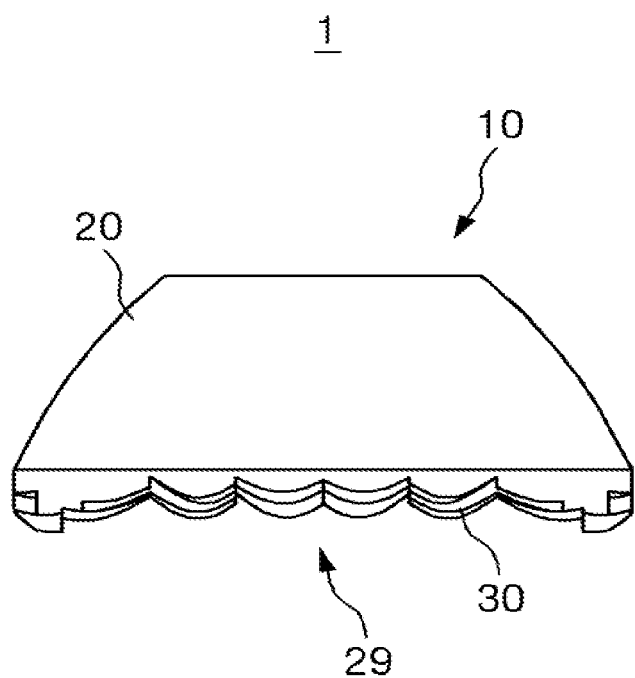
FIG. 3 is an exemplary plan view illustrating a lens of FIG. 1.
Figure 4:
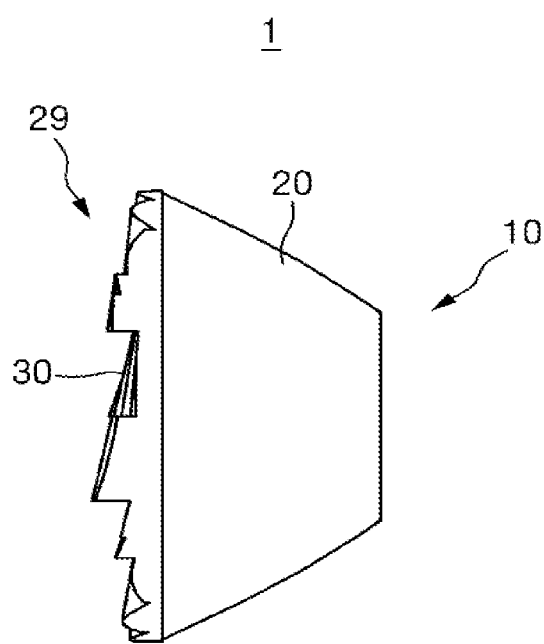
FIG. 4 is an exemplary side view illustrating a lens of FIG. 1.
Figure 5:
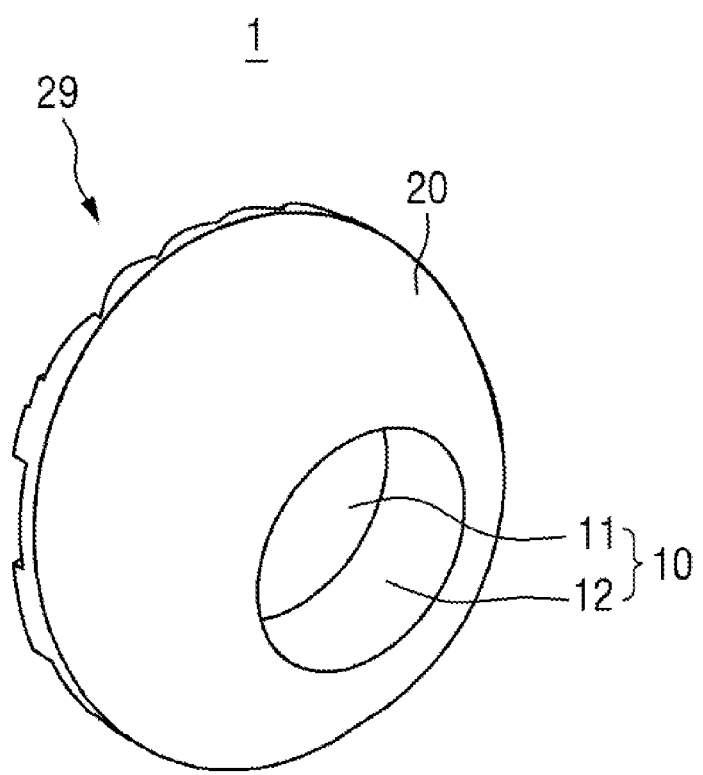
FIG. 5 is an exemplary rear perspective view illustrating a lens of FIG. 1.

FIG. 1 is an exemplary perspective view illustrating a lens of a lamp for a vehicle according to the present disclosure, and FIG. 2 is an exemplary schematic cross-sectional view taken along line A-A in FIG. 1. FIG. 3 is an exemplary plan view illustrating a lens of FIG. 1, and FIG. 4 is an exemplary side view illustrating a lens of FIG. 1. FIG. 5 is an exemplary rear perspective view illustrating a lens of FIG. 1. As illustrated in FIGS. 1 to 5, a lamp for a vehicle according to the present disclosure includes a lens 1 and a light source 41. The lamp for a vehicle according to an exemplary embodiment of the present disclosure may be one of lamps that constitute a headlamp of a vehicle, and the lens 1 may generate a predetermined beam pattern that is emitted to a front side of the vehicle through refraction of light that is emitted from the light source 41.

The lens 1 may include a light incident portion 10, a light exit portion 29, and a total reflection portion 20. The light incident portion 10 may form a rear portion of the lens 1, and the light exit portion 29 may form a front portion of the lens 1. The total reflection portion 20 connects the light exit portion 29 and the light incident portion 10 to each other, and forms a side portion of the lens 1. The light exit portion 29 may be composed of a plurality of facets 30. Each facet may have an independent curvature. Accordingly, the plurality of facets 30 may have different sizes and curvatures, respectively, and may be classified into a plurality of groups having similar sizes or curvatures. The sizes and the curvatures of the respective facets 30 may be designed to form a low-beam pattern (see FIG. 9) in which a combination of lights that are emitted from the light source 41 and pass through the respective facets 30 forms a cutoff line.

Further, the light incident portion 10 may be formed recessed toward the interior of the lens 1. As illustrated in FIG. 2, the light incident portion 10 may be formed inwardly when the diameter of the lens 1 is gradually decreased toward the interior of the lens 1. The light incident portion 10 may include a first light incident surface 11 that faces the light exit portion 29 and a second light incident portion 12 that may be formed to extend from the first light incident surface 11 toward the rear of the lens 1. The first light incident surface 11 may be formed to have a convex surface toward the rear of the lens 1. The second light incident surface 12 may form a curved body of which the diameter may be gradually decreased toward the first light incident surface 11.

The total reflection portion 20 may connect an outline of the light exit portion 20 and an outline of the light incident portion 10 to each other, and may form a side portion of the lens 1. The diameter of the rear end of the second light incident surface 12 may be formed to be less than the diameter of the outermost line of the light exit portion 29. The total reflection portion 20 that connects the light exit portion 29 and the light incident portion 10 may form a curved body of which the diameter may be gradually increased toward the light exit portion 29.

As illustrated in FIG. 2, the total reflection portion 20 may be configured to perform total reflection of the light that may be emitted from the light source 41 and may be incident to the total reflection portion 20 toward the plurality of facets 30 of the light exit portion 29. Further, the total reflection portion 20 may be formed with a curvature that may reflect the light that is emitted from the light source 41 and is incident to the total reflection portion 20 substantially in parallel to an optical axis A of the lens 1. For example, the total reflection portion 20 may include a parabolic surface having a focal point that may be put on the light source 41.

As illustrated in FIG. 2, the light source 41 may be disposed adjacent to the light incident portion 10 of the lens 1. In FIG. 2, it is exemplified that the light source 41 may be positioned external the lens 1, but as another embodiment, the light source 41 may be positioned within the light incident portion 10. The light source 41 may be positioned on the optical axis A of the lens 1. At the same time, the light source 41 may be positioned on the focal point of the lens 1. Parts L2 and L3 of lights L1, L2, L3, and L4 that are emitted from the light source 41 may be incident to the first light incident surface 11 and may pass through the facets 30 of the light exit portion 29 without passing through the total reflection portion 20. Further, parts L1 and L4 of the lights L1, L2, L3, and L4 that are emitted from the light source 41 may be incident to the second light incident surface 12, may be totally reflected by the total reflection portion 20, and may pass through the facets 30 of the light exit portion 29.

As described above, since the second light incident surface 12 forms a curved body of which the diameter may be gradually decreased toward the first light incident surface 11. As illustrated in FIG. 2, the lights L1 and L4 that are incident to the second light incident surface 12 are further refracted in an outward direction of the lens 1 to be incident into the lens 1. Accordingly, the lights L1 and L4 that are emitted from the light source 41 may be incident to the total reflection portion 20 more efficiently. The facets 30 of the light exit portion 29 may form a low-beam pattern in which the light emitted from the light source 41 passes through the respective facets 30 to form a cutoff line in front of the vehicle. As illustrated in FIG. 2, at least partial facets 30a and 30b among the facets 30 may be formed to include inclined surfaces that are inclined upward with respect to the optical axis A of the lens 1 so that the lights L2 and L3 exit downward to form a low-beam pattern.

According to the lamp for a vehicle according to the present disclosure, the low-beam pattern may be formed using the facets 30 having independent curvatures and sizes without using a separate shield. In particular, since the lens 1 of the lamp for a vehicle according to a first embodiment of the present disclosure includes rectangular facets 31 and inclined facets 32 and the inclined facets 32 are formed on the light exit portion 30, an inclined line of the cutoff line of the low-beam pattern may be formed without using a separate shield.

Hereinafter, a lamp for a vehicle according to various exemplary embodiments of the present disclosure will be described. For convenience in explanation, the same reference numerals are used for constituent elements having the same roles as those of the lamp for a vehicle according to the present disclosure as described above, and the detailed explanation thereof will be omitted.

Figure 6:
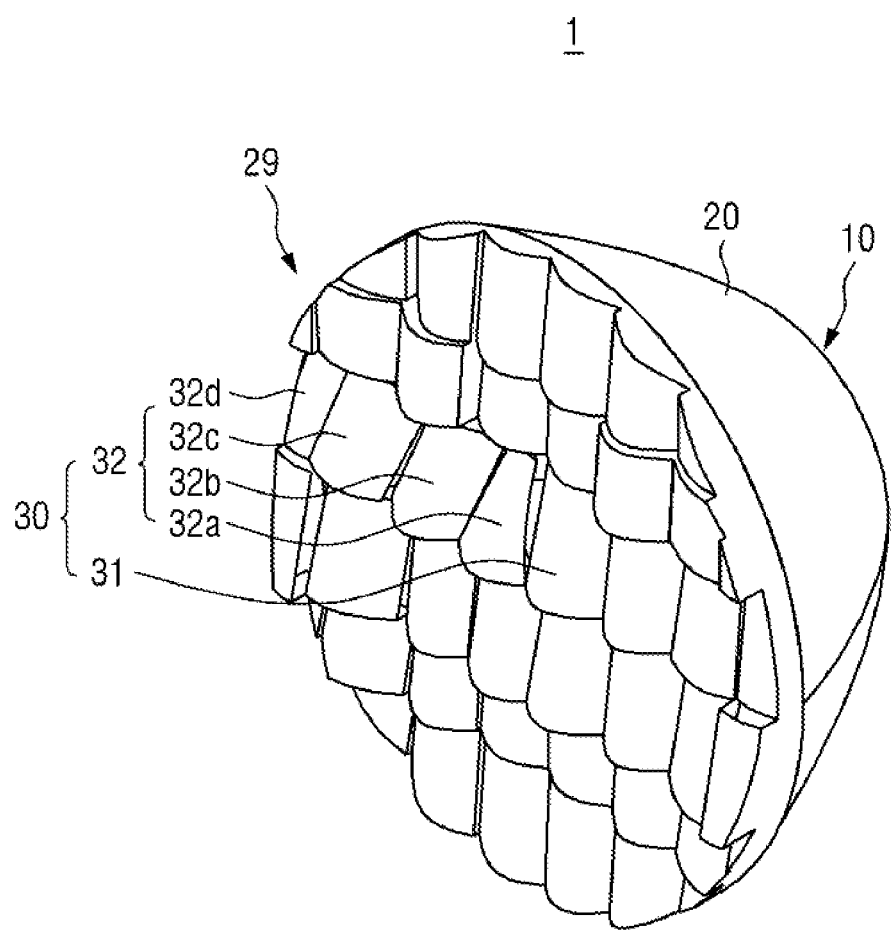
FIG. 6 is an exemplary perspective view illustrating a lens of a lamp for a vehicle according to an exemplary embodiment of the present disclosure.
Figure 7:
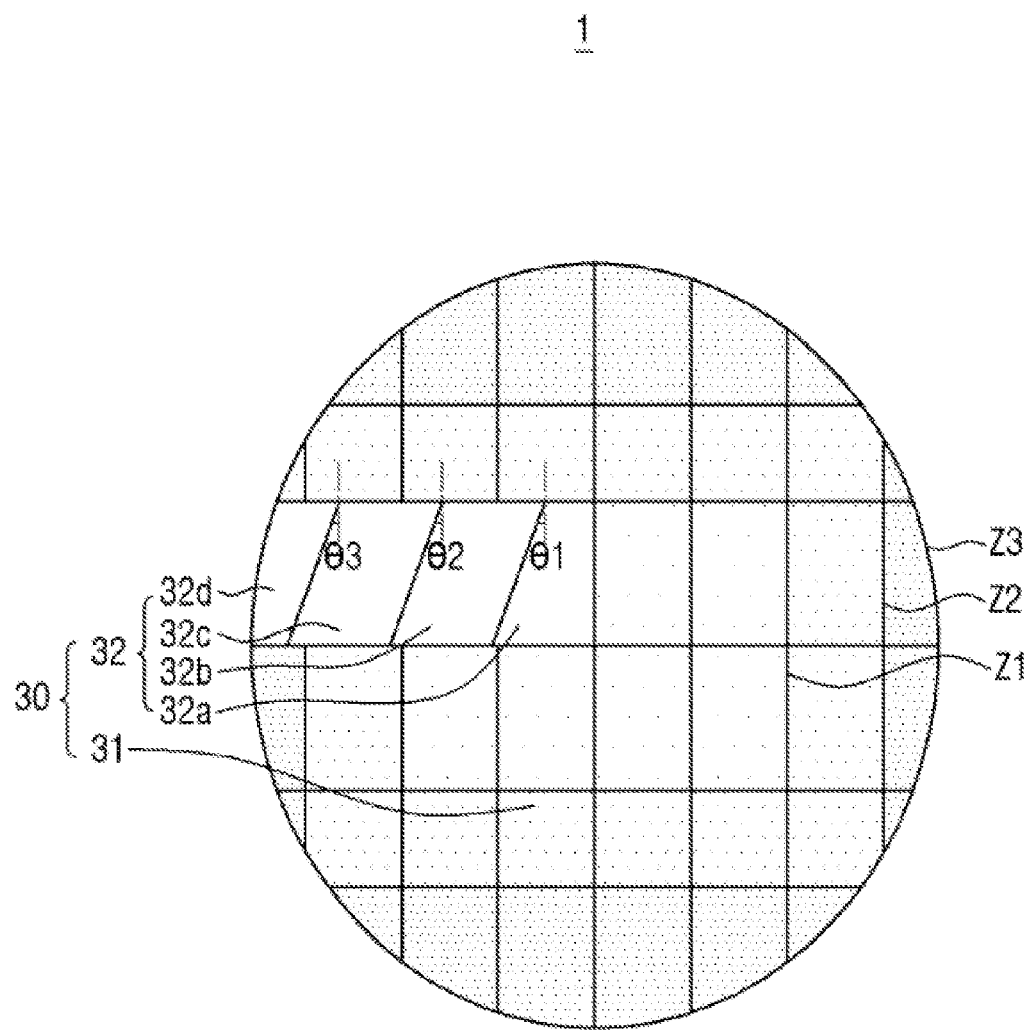
FIG. 7 is an exemplary front view illustrating a lens of FIG. 6.
Figure 8:
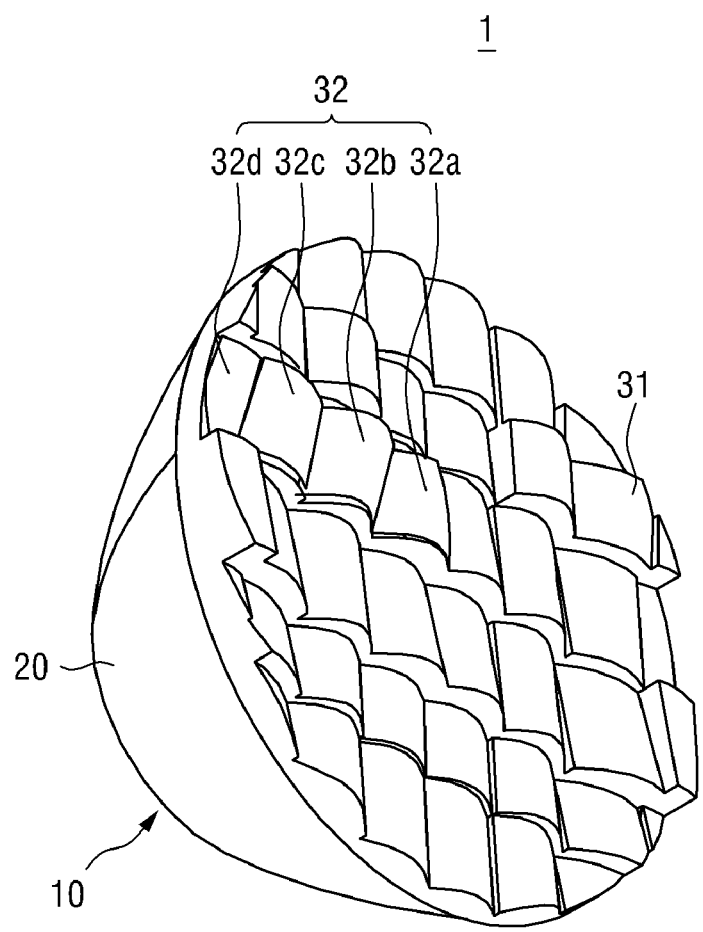
FIG. 8 is an exemplary bottom perspective view illustrating a lens of FIG. 6.
Figure 9:
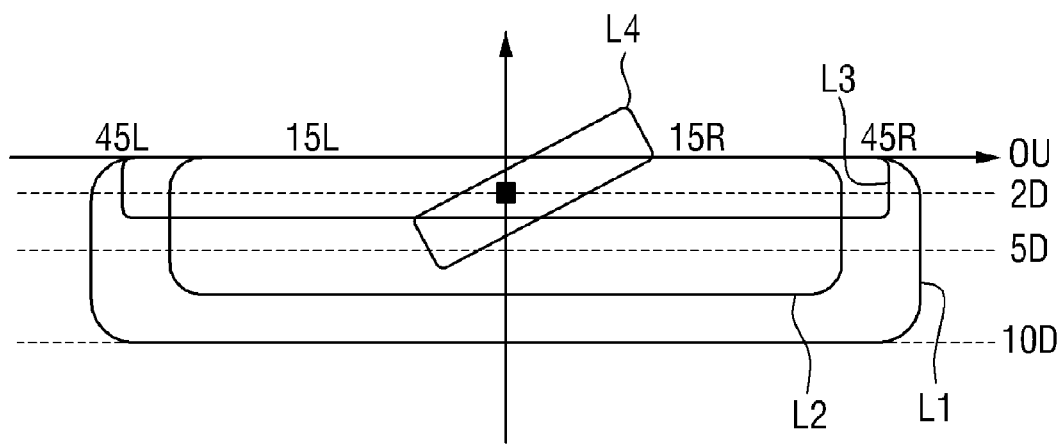
FIG. 9 is an exemplary view schematically illustrating a low-beam pattern that is implemented by a lamp for a vehicle according to an exemplary embodiment of the present disclosure.

FIG. 6 is an exemplary a perspective view illustrating a lens of a lamp for a vehicle according to a first embodiment of the present disclosure. FIG. 7 is an exemplary front view illustrating a lens of FIG. 6, and FIG. 8 is an exemplary bottom perspective view illustrating a lens of FIG. 6. FIG. 9 is an exemplary view schematically illustrating a low-beam pattern that is implemented by a lamp for a vehicle according to a first embodiment of the present disclosure. Further, FIG. 6 is an exemplary perspective view from which illustration of a light source 41 according to the present disclosure is omitted.

As illustrated in FIGS. 6 to 8, a lens 1 of a lamp for a vehicle according to the first embodiment of the present disclosure may include a light incident portion 10, a total reflection portion 20, and a light exit portion 29. The light exit portion 29 may include a plurality of facets 30, and the plurality of facets 30 include rectangular facets 31 and inclined facets 32. The rectangular facets 31 may be facets in which boundary lines that are formed between the rectangular facets and the neighboring facets are formed horizontally or vertically. The rectangular facets 31 may be formed to have rectangular or square boundary lines. Further, the facets disposed at edges of the light exit portion 29 among the rectangular facets 31 may be formed to have horizontal or vertical boundary lines and arc-shaped boundary lines. This is because the light exit portion 29 has a circular outline. Accordingly, in accordance with the shape of the outline of the light exit portion 29, the rectangular facets 31 disposed at the edges of the light exit portion 29 may have boundary lines having various shapes.

Conversely, the inclined facets 32 may be facets in which at least portions of the boundary lines that are formed between the inclined facets and the neighboring facets are formed to be inclined with respect to a virtual vertical line. The inclined facets 32 may be formed on one side of a center portion of the light exit portion 29. In the first embodiment of the present disclosure, the inclined facets 32 of the lens 1 may include a first inclined facet 32a, a second inclined facet 32b, a third inclined facet 32c, and a fourth inclined facet 32d which are arranged from the center portion of the light exit portion 29 to the right side. The upper, lower, and left sides of the first inclined facet 32a are adjacent to the rectangular facets 31, and the right side thereof neighbors the second inclined facet 32b. The boundary lines that are adjacent to the rectangular facets 31 may be formed horizontally or vertically. The boundary line that neighbors the second inclined facet 32b may form an angle of θ1 with a virtual vertical line and may be inclined in right downward direction. Accordingly, the boundary lines between the first inclined facet 32a and the neighboring facets may form substantially a trapezoid.

The upper and lower sides of the second inclined facet 32b are adjacent to the rectangular facets 31, the left side thereof neighbors the first inclined facet 32a, and the right side thereof neighbors the third inclined facet 32c. The boundary lines that are adjacent to the rectangular facets 31 are formed horizontally or vertically. The boundary line that is adjacent to the third inclined facet 32c forms an angle of θ2 with the virtual vertical line and may be inclined in the right downward direction. Accordingly, the boundary lines between the second inclined facet 32b and the adjacent facets form substantially a trapezoid. When the angles of θ1 and θ2 are substantially equal to each other, the boundary lines between the second inclined facet 32b and the neighboring facets may form substantially a parallelogram.

The upper and lower sides of the third inclined facet 32c are adjacent to the rectangular facets 31. The left side thereof neighbors the second inclined facet 32b, and the right side thereof neighbors the fourth inclined facet 32d. The boundary lines that are adjacent to the rectangular facets 31 may be formed horizontally or vertically. The boundary line that is adjacent to the fourth inclined facet 32d may form an angle of θ3 with the virtual vertical line and may be inclined in the right downward direction. Accordingly, the boundary lines between the third inclined facet 32c and the adjacent facets may form substantially a trapezoid. When the angles of θ2 and θ3 are substantially equal to each other, the boundary lines between the second inclined facet 32b and the adjacent facets may form substantially a parallelogram.

The upper and lower sides of the fourth inclined facet 32d may be adjacent to the rectangular facets 31. The left side thereof neighbors the third inclined facet 32c, and the right side thereof forms an outline of the light exit portion 29. Accordingly, the upper and lower boundary lines that are adjacent to the rectangular facets 31 may be formed horizontally. The left boundary line adjacent to the third inclined facet 32c may form an angle of θ3 with the virtual vertical line and may be inclined in the right downward direction. However, the right boundary line may be formed in an arc shape. When the right boundary line does not have a circular outline with respect to the light exit portion 29, the shape of the right boundary line may differ.

In the first embodiment of the present disclosure, although it is exemplified that the lens 1 has four inclined facets 32a, 32b, 32c, and 32d that are formed in a line on the right side of the center portion of the light exit portion 29, the inclined facets 32a, 32b, 32c, and 32d may be formed on the left side of the center portion of the light exit portion 29 depending on embodiments. Further, in the first embodiment of the present disclosure, although it is exemplified that the lens 1 may have four inclined facets 32a, 32b, 32c, and 32d that are formed in a line on the light exit portion 29, the number of inclined facets 32a, 32b, 32c, and 32d and the arrangement method thereof may differ depending on embodiments.

Since most of the rectangular facets 31 may be formed to have rectangular or square boundary lines, the beam patterns that may be formed by the light exiting through the rectangular facets 31 may also become rectangular or square beam patterns. However, since at least portions of the boundary lines of the inclined facets 32 may be formed to be inclined with respect to the virtual vertical line, at least portions of the beam patterns that are formed by the light exiting through the rectangular facets 31 may also become beam patterns that are formed to be inclined with respect to the horizontal line or the vertical line. In the first embodiment of the present disclosure, the lens 1 forms the inclined lines of the cutoff line of the low-beam pattern via the light exiting through the rectangular facets 32.

As illustrated in FIG. 9, a beam pattern L4 that may be formed by the light exiting through the inclined facets 32 forms an inclination that is inclined with respect to the horizontal line. Further, since facet surfaces of the inclined facets 32 are designed so that a portion of the beam pattern L4 that is formed by the respective inclined facets 32 projects from the center of the cutoff line of the low-beam pattern to the right side, the inclined lines of the cutoff line of the low-beam pattern may be formed.

The pattern may be a beam pattern exiting from a lamp for a vehicle mounted on a vehicle that operates in a country or a region in which right-hand traffic may be compulsory, and in the beam pattern exiting from a lamp for a vehicle mounted on a vehicle that operates in a country or a region in which left-hand traffic may be compulsory, a portion of the beam pattern L4 that is formed by the light exiting through the inclined facets 32 may be formed to project from the center of the cutoff line of the low-beam pattern to the left side. In other words, the inclined facets 32a, 32b, 32C, and 32d may be formed on the left side of the center portion of the light exit portion 29. However, since the facet surfaces of the inclined facets 32a, 32b, 32c, and 32d may be independently designed, the locations of the inclined facets 32a, 32b, 32c, and 32d do not depend on the traffic direction of the vehicle.

Conversely, as illustrated in FIG. 7, the light exit portion 29 may be divided into three types of regions Z1, Z2, and Z3. The first region Z1 may be a center region of the light exit portion 29, and the third region Z3 may be an exterior region of the light exit portion 29. The second region Z2 may be a region positioned between the center region and the exterior region, and may be a region of the light exit portion 29 excluding the first region Z1 and the third region Z3. The square facets 32 may be excluded from the respective regions Z1, Z2, and Z3. The facets disposed in the first region Z1 may be formed so that the beam pattern that is formed by a combination of lights that exits from the facets positioned in the first region Z1 forms a dispersed beam pattern L1 of the low-beam pattern. The dispersed beam pattern L1 may be a beam pattern having a width that may be substantially equal to the width of the low beam, and may be a beam pattern that is distributed in not only a short-distance region of the low beam but also a region that may be adjacent to the cutoff line that is formed in a long distance.

Since the first region Z1 may be a region that is most adjacent to the light source 41 among the three regions Z1, Z2, and Z3, an optical image that exits from the facets positioned in the first region Z1 may be greater than an optical image that exits from the facets positioned in other regions Z2 and Z3, and has a high light intensity. Accordingly, it may be suitable to use the beam pattern that exits from the facets of the first region Z1 as the dispersed beam pattern L1 that is distributed on the widest region among the low-beam pattern. The facets disposed in the second region Z2 may be formed so that the beam pattern that may be formed by a combination of lights that exits from the facets positioned in the second region Z2 forms a mid spread beam pattern L2 of the low-beam pattern. The mid spread beam pattern L2 may include a beam pattern having a width that may be less than the width of the dispersed beam pattern L1, and may be a beam pattern formed in a long distance and in a mid distance rather than in a short distance of the low beam.

The facets disposed in the third region Z3 may be formed so that the beam pattern that is formed by a combination of lights that exit from the facets positioned in the third region Z3 forms a spot beam pattern L3 of the low-beam pattern. The spot beam pattern L3 may be a beam pattern that is formed adjacent to the cutoff line of the beam pattern of the low beam, and may be a beam pattern that is concentratedly formed in a long distance of the low beam. Since the third region Z3 may be a region that is the greatest distance away from the light source 41 among the three regions Z1, Z2, and Z3, an optical image that exits from the facets positioned in the third region Z3 is less than an optical image that exits from the facets positioned in other regions Z1 and Z2, and has a low light intensity. Accordingly, it may be suitable to use the beam pattern that exits from the facets of the third region Z3 as the spot beam pattern L3 that is distributed on the narrowest region among the low-beam pattern.

According to the lamp for a vehicle according to the first embodiment of the present disclosure, the dispersed beam pattern L1, the mid spread beam pattern L2, and the spot beam pattern L3 of the low beam may be formed using the plurality of facets 30 having independent curvatures and sizes without using a separate shield. The cutoff line having the inclined line that is formed in the center portion thereof may be generated in the low-beam pattern.

Figure 10:
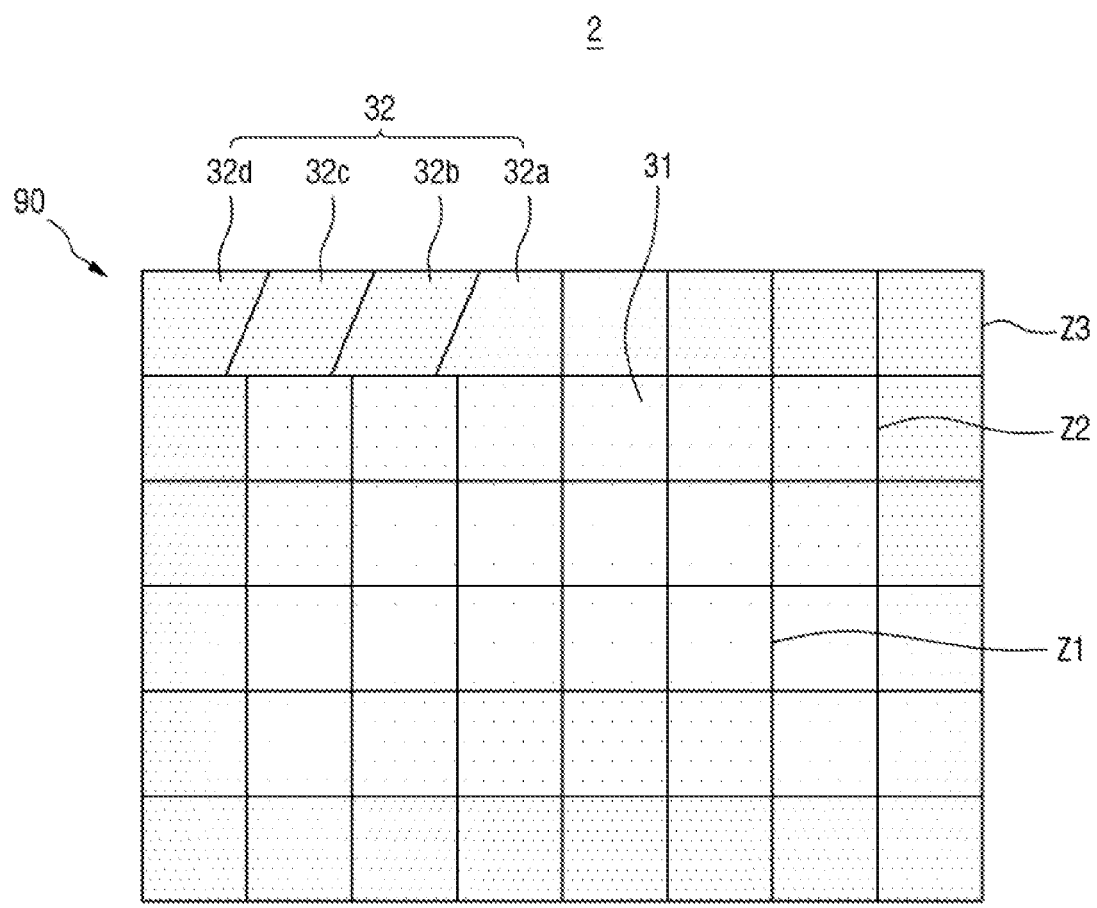
FIG. 10 is an exemplary front view illustrating a lens of a lamp for a vehicle according to a second embodiment of the present disclosure.

FIG. 10 is an exemplary front view illustrating a lens of a lamp for a vehicle according to a second embodiment of the present disclosure. A light exit portion 90 of a lens 2 of FIG. 10 may have a substantially a rectangular shape whereas the light exit portion 29 of the lens 1 according to the first embodiment as described above has a circular shape. In the lamp for a vehicle according to the second embodiment of the present disclosure, the light exit portion 90 of the lens 2 may include a plurality of facets 30, and the light exit portion 90 may be divided into three kinds of regions Z1, Z2, and Z3. The first region Z1 may be a center region of the light exit portion 90, and the third region Z3 may be an exterior region of the light exit portion 90. The second region Z2 may be a region positioned between the center region and the exterior region, and may be a region of the light exit portion 90 excluding the first region Z1 and the third region Z3. As described above, the beam pattern exiting from the facets of the first region Z1 may be used as a dispersed beam pattern L1 of the low-beam pattern, and the beam pattern exiting from the facets of the second region 72 may be used as a mid spread beam pattern L2 of the low-beam pattern. The beam pattern exiting from the facets positioned in the third region Z3 may be used as a spot beam pattern L3 of the low-beam pattern.

The beam pattern L4, which forms an inclined line, of the cutoff line of the low-beam pattern may be adjacent to the spot beam pattern L3 or partially overlaps the spot beam pattern L3. Accordingly, it may be advantageous in designing the facet surfaces of the inclined facets 32 that the inclined facets 32 which form the beam pattern L4 that forms the inclined lines are positioned in the third region Z3 of the light exit portion 90 that forms the spot beam pattern L3. Further, the inclined facets 32 may be positioned on the corner side of the light exit portion 90 in the third region Z3. In this case, the rectangular facets 31 adjacent to the inclined facets 32 may be minimized to facilitate the design of the lens 2.

Figure 11:
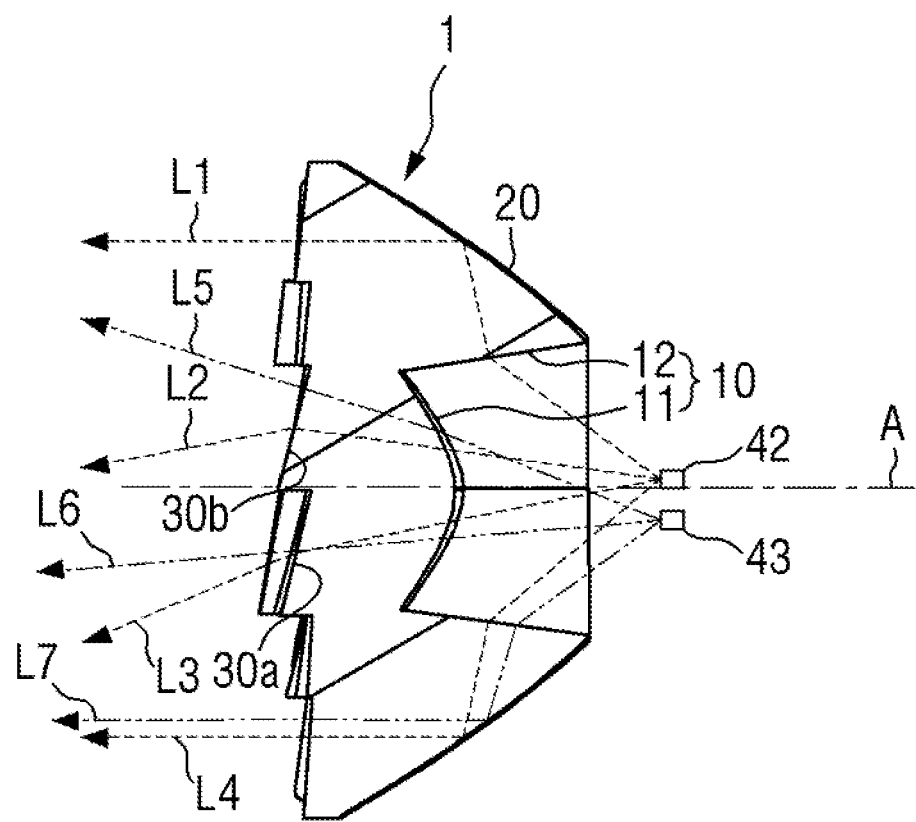
FIG. 11 is an exemplary schematic cross-sectional view illustrating a lamp for a vehicle according to an exemplary embodiment of the present disclosure.
Figure 12:
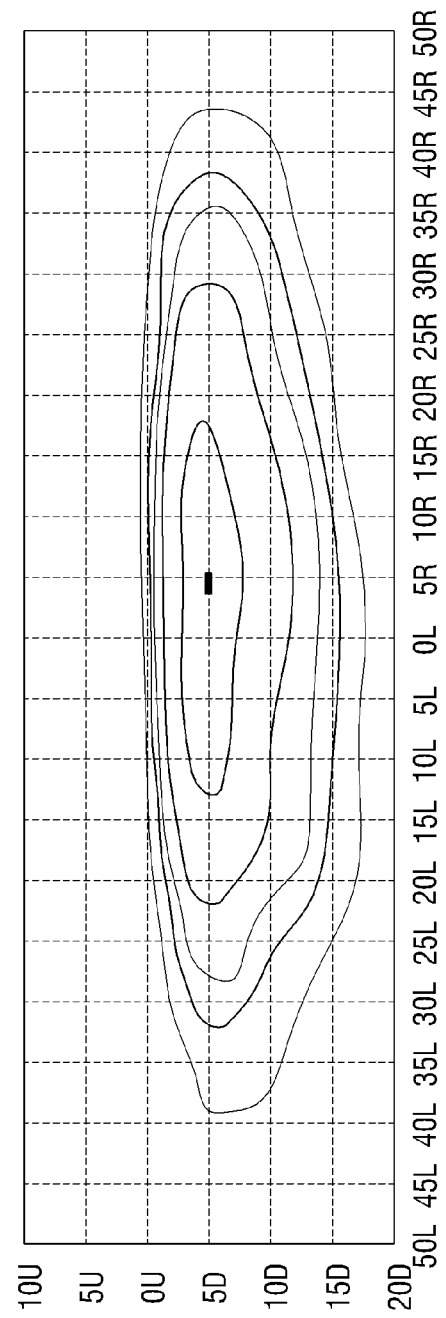
FIG. 12 is an exemplary view illustrating a low-beam pattern that is implemented by a first light source of a lamp for a vehicle according to an exemplary embodiment of the present disclosure.
Figure 13:
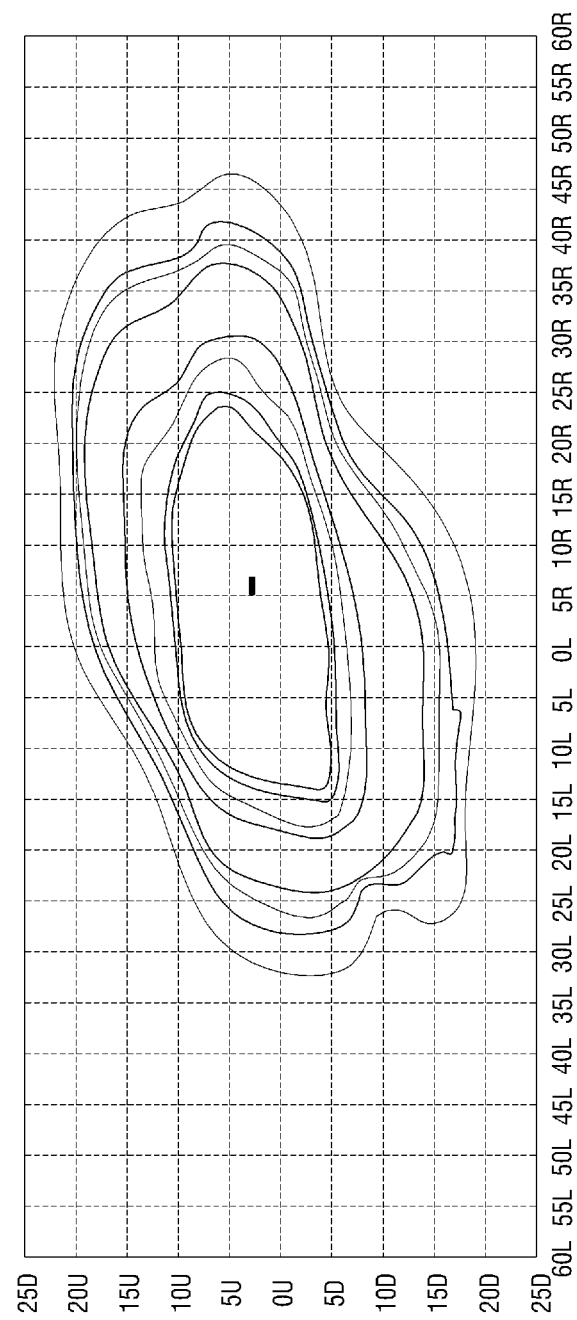
FIG. 13 is an exemplary view illustrating a DRL pattern that is implemented by a second light source of a lamp for a vehicle according to an exemplary embodiment of the present disclosure.

FIG. 11 is an exemplary schematic cross-sectional view illustrating a lamp for a vehicle according to a third embodiment of the present disclosure. FIG. 12 is an exemplary view illustrating a low-beam pattern that is implemented by a first light source of a lamp for a vehicle according to a third embodiment of the present disclosure, and FIG. 13 is an exemplary view illustrating a DRL pattern that is implemented by a second light source of a lamp for a vehicle according to a third embodiment of the present disclosure. As illustrated in FIG. 11, an exemplary lamp for a vehicle according to a third embodiment of the present disclosure may include a light incident portion 10, a total reflection portion 29, a light exit portion 29, a plurality of facets 30, a first light source 42, and a second light source 43. Accordingly, the lens 42 may be configured to generate a predetermined beam pattern that is radiated to a front side of the vehicle through refraction of light emitted from the first light source 42 and the second light source 43.

The sizes and the curvatures of the respective facets 30 may be designed to form a low-beam pattern (see FIG. 12) in which a combination of lights that are emitted from the first light source 42 and pass through the respective facets 30 forms a cutoff line. Further, the sizes and the curvatures of the respective facets 30 may be designed to emit a combination of the lights from the first light source 42 and pass through the respective facets 30 to form a high-beam pattern. Hereinafter, for convenience in explanation, a case where the low-beam pattern may be implemented by the light emitted from the first light source 42 will be described as a basis. Accordingly, the total reflection portion 20 performs total reflection of the lights that are emitted from the first light source 42 and the second light source 43 and are incident to the total reflection portion 20 toward the plurality of facets 30. Further, the total reflection portion 20 is formed with a curvature that may reflect the light that is emitted from the first light source 42 and may be incident to the total reflection portion 20 substantially in parallel to the optical axis A of the lens 1. For example, the total reflection portion 20 may include a parabolic surface having a focal point that is put on the first light source 42.

As illustrated in FIG. 11, the first light source 42 and the second light source 43 may be disposed adjacent to the light incident portion 10 of the lens 1. In FIG. 11, the first light source 42 and the second light source 43 may be positioned external the lens 1, but as another embodiment, at least one of the first light source 42 and the second light source 43 may be positioned within the light incident portion 10. The first light source 42 may be positioned on the optical axis A of the lens 1. At the same time, the first light source 42 may be positioned on the focal point of the lens 1. Parts L2 and L3 of lights L1, L2, L3, and L4 that are emitted from the first light source 42 may be incident to the first light incident surface 11 and may pass through the facets 30 of the light exit portion 29 without passing through the total reflection portion 20. Further, parts L1 and L4 of the lights L1, L2, L3, and L4 that are emitted from the second light source 43 may be incident to the second light incident surface 12, may be totally reflected by the total reflection portion 20, and may pass through the facets 30 of the light exit portion 29.

As described above, since the second light incident surface 12 may form a curved body of which the diameter may be gradually decreased toward the first light incident surface 11. As illustrated in FIG. 11, the lights L1 and L4 that are incident to the second light incident surface 12 are further refracted in an outward direction of the lens 1 to be incident into the lens 1. Accordingly, the lights L1 and L4 that are emitted from the first light source 42 may be incident to the total reflection portion 20 more efficiently.

The facets 30 of the light exit portion 29 may be designed to form a low-beam pattern in which the light emitted from the first light source 42 passes through the respective facets 30 to form a cutoff line in front of the vehicle. Accordingly, in the lamp for a vehicle according to the third embodiment of the present disclosure, the low-beam pattern may be formed using the facets 30 having independent curvatures and sizes without using a separate shield. At least partial facets 30a and 30b among the facets 30 are formed to include inclined surfaces that are inclined upward with respect to the optical axis A of the lens 1 so that the lights L2 and L3 exit downward to form the low-beam pattern.

FIG. 12 is an exemplary view illustrating a beam pattern that may be expressed on a 25 m screen disposed in front of the vehicle. The curvatures, shapes, and sizes of respective facets 30 are designed so as to locate the light of the first light source 42 that may be incident to the facets 30 within the low-beam pattern of FIG. 12 through refraction of the light of the first light source 42. Referring again to FIG. 11, the second light source 43 may be positioned on the lower portion of the first light source 42. Accordingly, the second light source 43 may be positioned below the optical axis A of the lens 1.

Parts L5 and L6 of lights L5, L6, and L7 that are emitted from the second light source 43 may be incident to the first light incident surface 11 and may pass through the facets 30 of the light exit portion 29 without passing through the total reflection portion 20. Further, a part L7 of the lights L5, L6, and L7 that are emitted from the second light source 43 may be incident to the second light incident surface 12, may be reflected by the total reflection portion 20, and may pass through the facets 30 of the light exit portion 29. The light L7 that is incident to the second light incident surface 12 may be further refracted in an outward direction of the lens 1 to be incident into the lens 1. Accordingly, the light L7 that is emitted from the second light source 43 may be incident to the total reflection portion 20 more efficiently.

In particular, where the total reflection portion 20 may be designed to include a parabolic surface having a focal point that is put on the first light source 42, the lights L1 and L4 that are totally reflected by the total reflection portion 20 among the lights L1, L2, L3, and L4 that are emitted from the first light source 42 may be mostly reflected substantially in parallel to the optical axis A. Conversely, the light L7 that is totally reflected by the total reflection portion 20 may be mostly reflected not in parallel to the optical axis A. Further, since the respective facets 30 are designed so that the lights emitted from the first light source 42 that is positioned on the optical axis A form the cutoff line and form the low-beam pattern that is distributed on the lower portion of the cutoff line, parts of the lights emitted from the second light source 43 that is positioned on the lower portion of the optical axis A are radiated onto the upper portion of the cutoff line over the cutoff line by the facets 30.

FIG. 13 is an exemplary view illustrating a beam pattern that is expressed on a 25 m screen disposed in front of the vehicle. Lights emitted from the second light source 43 pass through the lens 1 and form a beam pattern that may be formed on upper and lower portions of the cutoff line that may be formed in the low-beam pattern of FIG. 12. The lights emitted from the second light source 43 may be used as a Daytime Running Light (DRL) pattern (e.g., a daytime running beam pattern). Further, the lights emitted from the second light source 43 may be used as a position beam pattern through dimming control of the second light source 43.

According to the automotive light distribution regulations, it may be required that the low-beam pattern which is radiated onto a screen that is positioned about 25 m in front of the automobile has an optical width measured from 20L to 20R. Further, the daytime running beam pattern and the position beam pattern which is radiated onto a screen that is positioned about in 25 m front of the automobile may have an optical width measured from 20L to 20R. Since the optical width in the daytime running beam pattern and the position beam pattern is similar to the optical width that is required in the low-beam pattern, the respective beam patterns may be formed using the same lens 1.

As illustrated in FIGS. 12 and 13, it may be confirmed that the low-beam pattern and the daytime running beam pattern that are implemented through the lamp for a vehicle according to the third embodiment of the present disclosure satisfy the light distribution regulations. As another embodiment, the light emitted from the second light source 43 may be used as a Static Bending Light (SBL) pattern, a Dynamic Bending Light (DBL) pattern, a cornering beam pattern, or a high-beam pattern. As described above, according to the lamp for a vehicle according to the third embodiment of the present disclosure, the low-beam pattern may be radiated onto the front side of the vehicle using a plurality of facets 30 having independent curvatures and sizes that are provided on the light exit portion 29 of the lens 1 without using a separate shield.

Further, the Static Bending Light (SBL) pattern, the Dynamic Bending Light (DBL) pattern, the cornering beam pattern, the daytime running beam pattern, the position beam pattern, or the high-beam pattern may be radiated onto the front side of the vehicle using the same lens 1. Accordingly, without the necessity of individually providing lamps for radiating beam patterns for respective functions in the headlamp of the vehicle, a plurality of beam patterns may be implemented and two kinds of beam patterns may be implemented at the same time by the lamp for a vehicle according to the third embodiment of the present disclosure.

Figure 14:
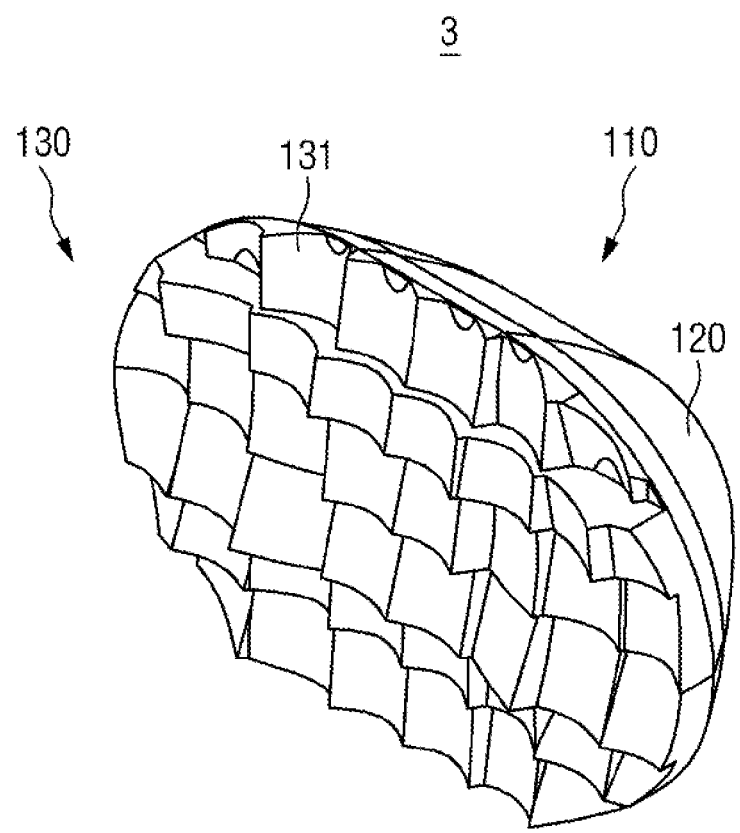
FIG. 14 is an exemplary front perspective view illustrating a lens of a lamp for a vehicle according to an exemplary embodiment of the present disclosure.
Figure 15:
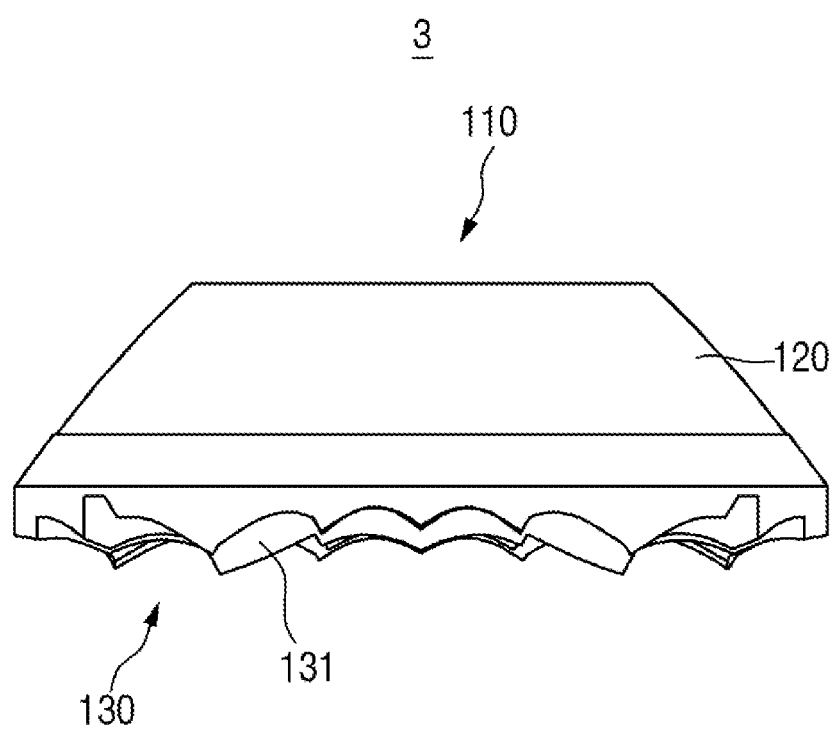
FIG. 15 is an exemplary plan view illustrating a lens of FIG. 14.
Figure 16:
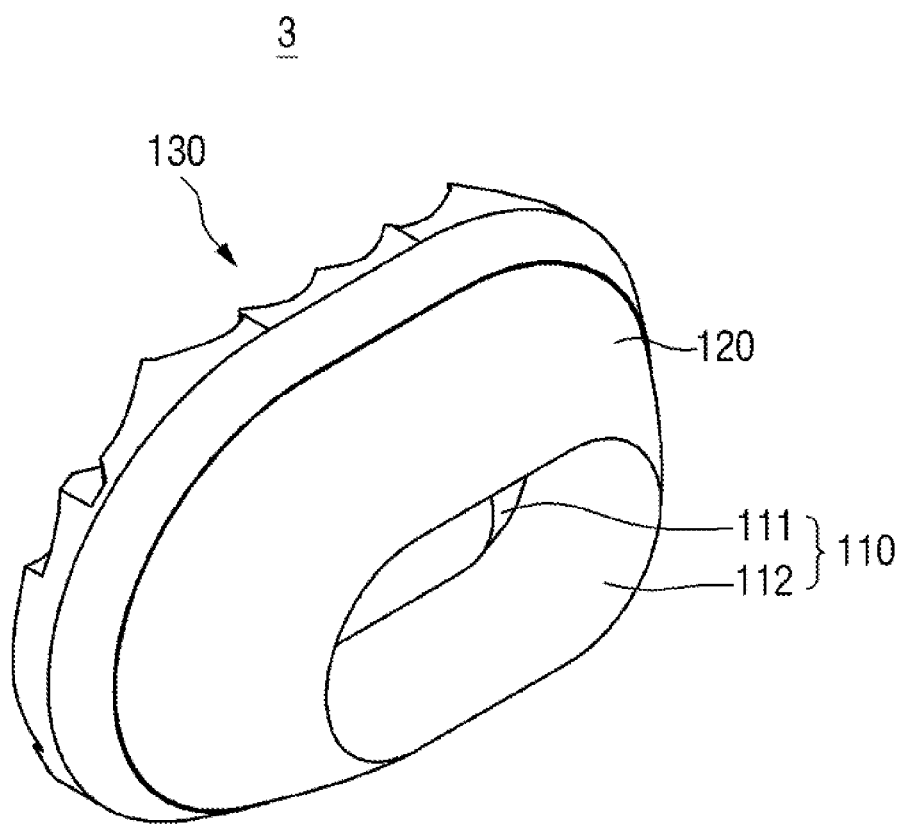
FIG. 16 is a rear perspective view illustrating a lens of FIG. 14.
Figure 17:
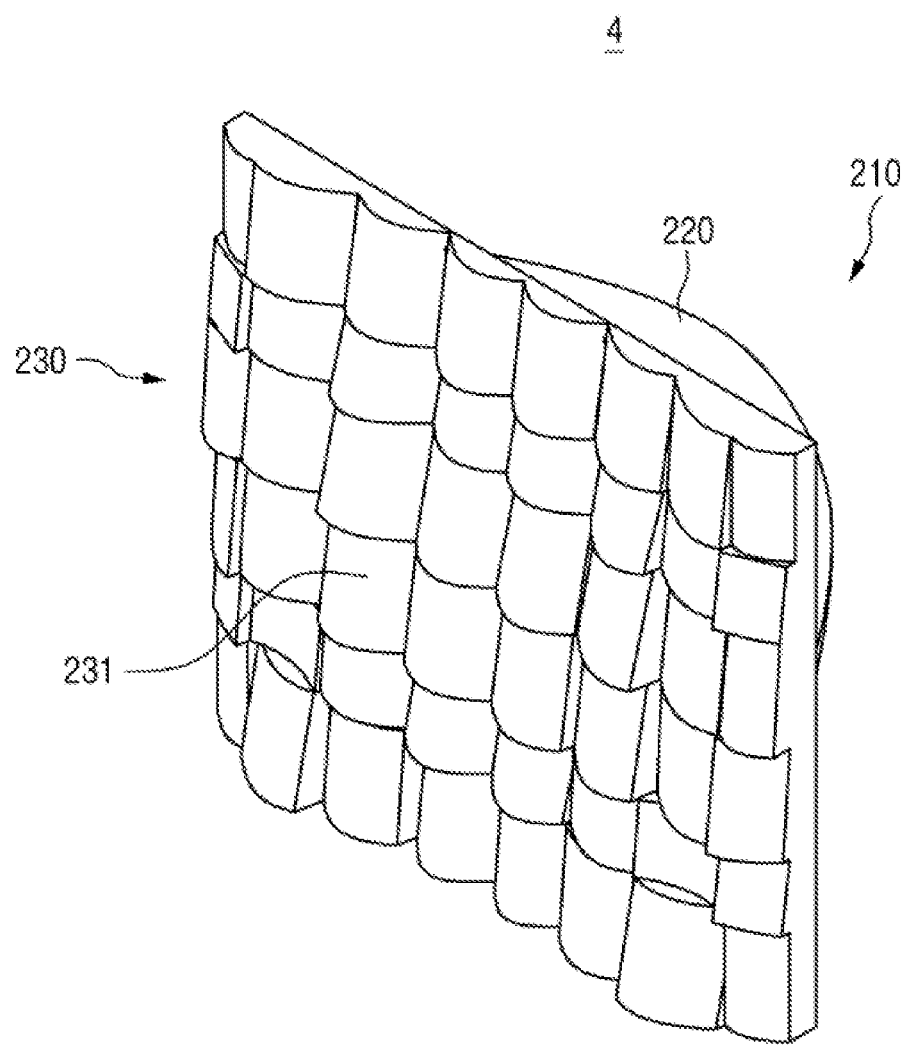
FIG. 17 is an exemplary front perspective view illustrating a lens of a lamp for a vehicle according to an exemplary embodiment of the present disclosure.
Figure 18:
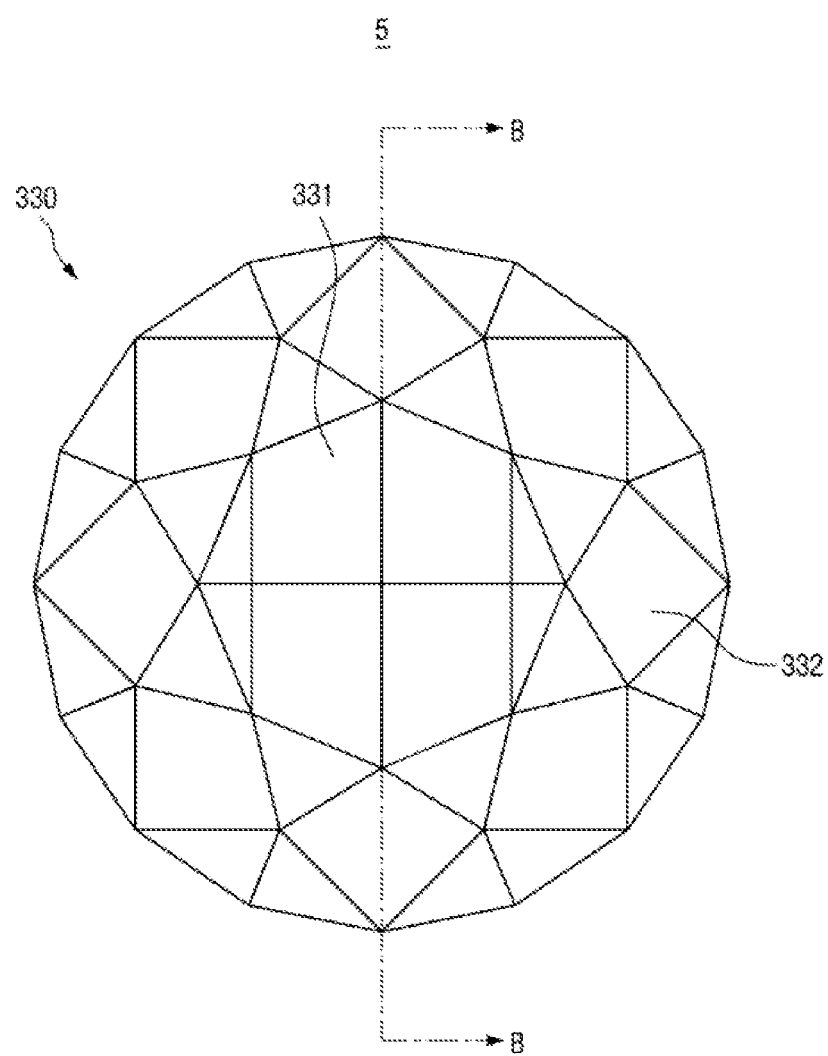
FIG. 18 is an exemplary front view illustrating a lens of a lamp for a vehicle according to an exemplary embodiment of the present disclosure.
Figure 19:
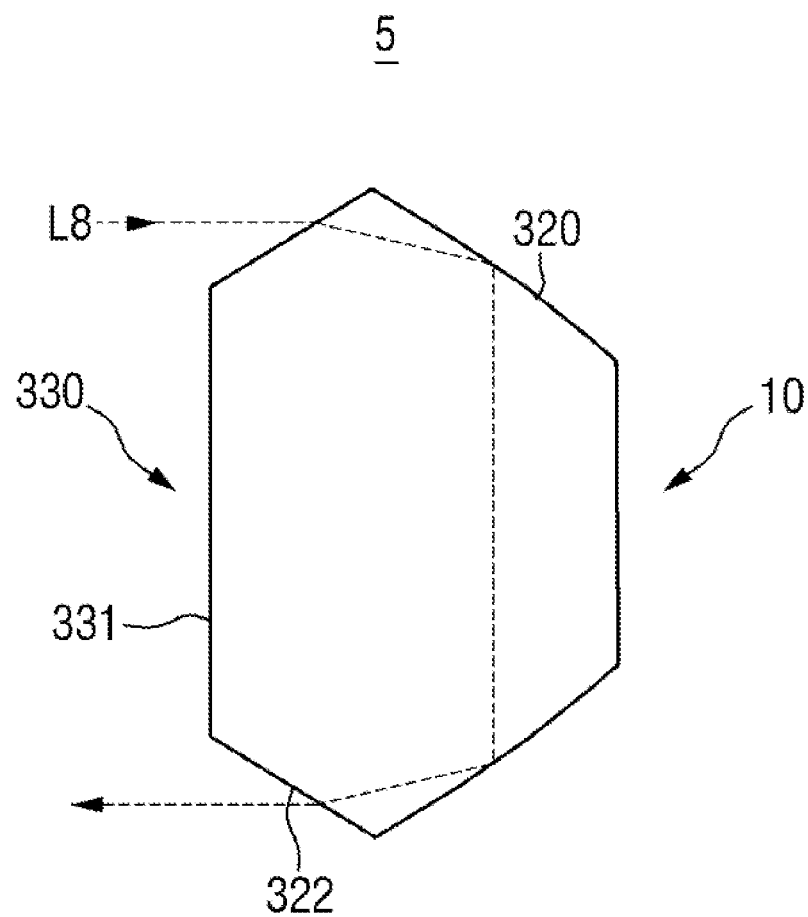
FIG. 19 is an exemplary schematic cross-sectional view taken along line B-B in FIG. 18.

FIG. 14 is an exemplary front perspective view illustrating a lens of a lamp for a vehicle according to a fourth embodiment of the present disclosure. FIG. 15 is an exemplary plan view illustrating a lens of FIG. 14. FIG. 16 is an exemplary rear perspective view illustrating a lens of FIG. 14. FIG. 17 is an exemplary front perspective view illustrating a lens of a lamp for a vehicle according to a fifth embodiment of the present disclosure. FIG. 18 is an exemplary front view illustrating a lens of a lamp for a vehicle according to a sixth embodiment of the present disclosure. FIG. 19 is an exemplary schematic cross-sectional view taken along line B-B in FIG. 18. As illustrated in FIGS. 14 and 15, according to a lamp for a vehicle according to a fourth embodiment of the present disclosure, facets 131 of a light exit portion 130 are entirely formed to have a concave curvature toward the inside of a lens 3.

The lamp according to the fourth embodiment may be different from the lamp for a vehicle according to the first and third embodiments of the present disclosure as illustrated in FIGS. 1 and 3, in which the facets 30 of the light exit portion 29 are formed to have a convex curvature to the external of the lens 1. Further, the facets of the light exit portion may include facets having a convex curvature, facets having a concave curvature, and flat facets in all. Since the facets of the lens according to the fourth embodiment of the present disclosure are formed for the purpose of forming a low-beam pattern that forms a cutoff line through refraction of light emitted from a first light source 42, they have independent curvatures for forming low-beam patterns through passing of the light of the first light source 42, and thus may be designed to have convex, flat, or concave curvatures.

Further, the lens 3 of the lamp for a vehicle according to the fourth embodiment of the present disclosure may be formed so that outlines of a light exit portion 130 and a light incident portion 110 are in an elliptical shape as illustrated in FIGS. 14 and 16, whereas the lens 1 of the lamp for a vehicle according to the third embodiment of the present disclosure may be formed so that the outlines of the light exit portion 29 and the light incident portion 10 are in a circular shape as illustrated in FIGS. 1 and 5. Accordingly, as illustrated in FIG. 16, a first light incident surface 111 of the light incident portion 110 may also have an elliptical outline, and a second incident surface 112 may form a curved body in which the lengths of the long axis and the short axis of an ellipse are gradually decreased toward the first incident surface 111.

Further, a total reflection portion 120 that connects the light exit portion 130 and the light incident portion 110 to each other may also form a curved body in which ellipses, of which the lengths of the long axis and the short axis are gradually increased toward the light exit portion 130, are laminated. According to embodiments, the light exit portion 130 may be formed in an elliptical shape and the light incident portion 110 may be formed in a circular shape. In contrast, the light exit portion 130 may be formed in a circular shape and the light incident portion 110 may be formed in an elliptical shape.

Except for the difference in shape as described above, functions of facets 131 of the light exit portion 130, the light incident portion 110, and the total reflection portion 120 may be the same as or similar to those according to the first and third embodiments. Further, forming of the low-beam pattern through penetration of light emitted from the first light source 42 through the lens 3, forming of the high-beam pattern formed on the upper and lower portions of the cutoff line of the low-beam pattern through penetration of light emitted from the second light source 43, and forming of the daytime running beam pattern or the position beam pattern are the same as those of the lamp for a vehicle according to the third embodiment of the present disclosure as described above.

As illustrated in FIG. 17, according to a lens 4 of a lamp for a vehicle according to a fifth embodiment of the present disclosure, a light exit portion 230 may be formed to have a rectangular outline shape, which may be different from the outline shapes of the light exit portions according to the first to fourth embodiments of the present disclosure. As described above, according to the lens 1 of the lamp for a vehicle according to the first and third embodiments of the present disclosure, the outline of the light exit portion 30 may be formed in the circular shape as illustrated in FIG. 1, and according to the lens 3 of the lamp for a vehicle according to the fourth embodiment of the present disclosure, the outline of the light exit portion 130 may be formed in the elliptical shape as illustrated in FIG. 14.

Further, a light incident portion 210 may be formed to have a circular outline shape in a similar manner to the first embodiment, or may be formed to have an elliptical outline shape in a similar manner to the fourth embodiment. Further, a total reflection portion 220 may be formed as a curved body that connects the outline shape of the rectangular light exit portion 230 and the outline shape of the circular or elliptical light incident portion 210 to each other. Except for the difference in shape as described above, functions of facets 231 of the light exit portion 230, the light incident portion 210, and the total reflection portion 220 may be the same as or similar to those according to the first to fourth embodiments. Further, forming of the low-beam pattern through penetration of light emitted from the first light source 42 through the lens 3, forming of the high-beam pattern formed on the upper and lower portions of the cutoff line of the low-beam pattern through penetration of light emitted from the second light source 43, and forming of the daytime running beam pattern or the position beam pattern may be the same as those of the lamp for a vehicle according to the third and fourth embodiments of the present disclosure as described above.

As illustrated in FIGS. 18 and 19, according to a lens 5 of a lamp for a vehicle according to a sixth embodiment of the present disclosure, a light exit portion 330 has a shape that may be similar to cut and processed diamonds. Facets 331 and 332 that constitute the light exit portion 330 include first facets 331 formed to correspond to a table surface of the cut diamonds and second facets 332 formed to correspond to facet surfaces formed around the table surface of the cut diamonds. Accordingly, the second facets 332 may be designed to form an obtuse angle with the first facets 331. The first facets 331 may be composed of exit surfaces having triangular or pentagonal outlines and the second facets 332 may be composed of exit surfaces having triangular or rectangular outlines. The shapes of the first facets 331 and the second facets 332 as illustrated in FIG. 18 are exemplary, and may be designed to have other shapes.

In a similar manner to the above-described embodiments, the facets 331 and 332 of the light exit portion 330 may form a low-beam pattern or a high-beam pattern through penetration of light emitted from the first light source 42. Further, the facets 331 and 332 of the light exit portion 330 may form independent curvatures for forming an Static Bending Light (SBL) pattern, a Dynamic Bending Light (DBL) pattern, a cornering beam pattern, a high-beam pattern, a daytime running beam pattern, or a position beam pattern, which are formed on upper and lower portions of a cutoff line of the low-beam pattern through penetration of light emitted from the second light source 43. Each of the facets 331 and 332 may be formed of at least one of a facet having a convex curvature, a facet having a concave curvature, and a flat facet.

The lens 5 of the lamp for a vehicle according to the sixth embodiment of the present disclosure may perform total reflection of an external light L8 that is incident to the inside of the lens 5 through at least a portion of the facets 331 and 332 within the lens 5, and then may exit the reflected light through the facets 331 and 332 of the light exit portion 330 again. The external light may be sunlight, light radiated from another vehicle, or light radiated from a street lamp.

A total reflection portion 320 may perform total reflection of the external light L8 that is incident to the interior of the lens 5 through the facets 331 and 332 twice or more, and then exit the reflected light through the facets 331 and 332 again. Accordingly, the external light L8 that is incident to the interior of the lens 5 through the facets 331 and 332 may be totally reflected by the total reflection portion 320 on a first side, and then may be totally reflected again by the total reflection portion 320 on a second side to exit again to an exterior of the lens 5 through the facets 331 and 332. In the sixth embodiment of the present disclosure, since the lens 5 exits the external light L8 that may be incident to the inside of the lens 5 through the facets 331 and 332 again through the facets 331 and 332, a visual effect of incremental illumination (e.g., jewels like diamonds glittered by illumination) may be achieved. Accordingly, when seeing the vehicle mounted with the lens 5 according to the sixth embodiment of the present disclosure, an incremental illumination image (e.g., glittering jeweled image) may be observed regardless of whether the first light source 42 and the second light source 43 are turned on.

The first facets 331 may be designed to have curvatures for forming a low-beam pattern through penetration of the light emitted from the first light source 42 and forming the high-beam pattern, the daytime running beam pattern, or the position beam pattern that is formed on the upper and lower portions of the cutoff line of the low-beam pattern through penetration of the light emitted from the second light source 43. The second facets 332 may be designed to have a curvature that may reflect the external light L8 that is incident to the second facets 332 through the total reflection portion 320 and exit the reflected light to the second facets 332 again.

Although exemplary embodiments of the present disclosure have been described for illustrative purposes, those skilled in the art will appreciate that various modifications, additions and substitutions are possible, without departing from the scope and spirit of the disclosure as disclosed in the accompanying claims.

The invention claimed is:

1. A lamp for a vehicle, comprising:
   at least one light source having a first light source and a second light source; and
   a lens configured to refract light that is emitted from the at least one light source and to radiate the refracted light to a front side of the vehicle,
   wherein the lens is configured to refract light that exits from the first light source and light that exits from the second light source and radiates the refracted light to the front side of the vehicle,
   wherein the lens includes a light incident portion having the light emitted from the first light source and the second light source is incident and a light exit portion configured to refract and exit the light of the first light source and the second light source, which is incident to the lens through the light incident portion, and the light exit portion includes a plurality of facets having independent curvatures;
   wherein the plurality of facets are configured to form a main beam pattern through refraction of the light emitted from the first light source,
   wherein the lens includes a total reflection portion disposed between the light incident portion and the light exit portion, and
   wherein the total reflection portion performs total reflection of a portion of the light that is emitted from the first light source or the second light source and is incident into the lens through the light incident portion toward the plurality of facets.

2. The lamp for a vehicle of claim 1, wherein the main beam pattern is a low-beam pattern that forms a cutoff line.

3. The lamp for a vehicle of claim 2, wherein at least a portion of the plurality of facets include an inclined surface formed in a downward direction toward the front side of the vehicle.

4. The lamp for a vehicle of claim 2, wherein the first light source is disposed on an optical axis of the lens.

5. The lamp for a vehicle of claim 4, wherein the second light source is disposed on a lower portion of the first light source.

6. The lamp for a vehicle of claim 5, wherein the light emitted from the second light source is configured to be refracted by the plurality of facets, and forms a beam pattern that is formed on upper and lower portions of the cutoff line.

7. The lamp for a vehicle of claim 5, wherein a beam pattern that is formed by the light emitted from the second light source is used as at least one of an Static Bending Light (SBL) pattern, a Dynamic Bending Light (DBL) pattern, a cornering beam pattern, a daytime running beam pattern, and a position beam pattern.

8. The lamp for a vehicle of claim 7, wherein when the beam pattern that is formed by the light emitted from the second light source is used as the position beam pattern, the light emitted from the second light source is configured to be reduced.

9. The lamp for a vehicle of claim 1, wherein the total reflection portion is formed with a curvature configured to reflect the light that is incident to the total reflection portion among the lights emitted from the first light source in parallel to an optical axis of the lens.

10. The lamp for a vehicle of claim 9, wherein the light exit portion forms a front portion of the lens, the light incident portion forms a rear portion of the lens, and the total reflection portion connects the light exit portion and the light incident portion to each other and forms a side portion of the lens.

11. The lamp for a vehicle of claim 1, wherein the total reflection portion performs total reflection of an external light that is incident into the lens through at least a portion of the plurality of facets at least twice within the lens, and exits the reflected light to an exterior of the vehicle through the plurality of facets.

12. The lamp for a vehicle of claim 11, wherein the plurality of facets include an exit surface formed by at least two kinds of polygons.

13. The lamp for a vehicle of claim 1, wherein the main beam pattern is a high-beam pattern.

14. A lamp for a vehicle, comprising:
    at least one light source having a first light source and a second light source; and
    a lens configured to refract light that is emitted from the at least one light source and to radiate the refracted light to a front side of the vehicle,
    wherein the lens is configured to refract light that exits from the first light source and light that exits from the second light source and radiates the refracted light to the front side of the vehicle,
    wherein the lens includes a light incident portion having the light emitted from the first light source and the second light source is incident and a light exit portion configured to refract and exit the light of the first light source and the second light source, which is incident to the lens through the light incident portion, and the light exit portion includes a plurality of facets having independent curvatures,
    wherein the plurality of facets are configured to form a main beam pattern through refraction of the light emitted from the first light source, and
    wherein the light incident portion is formed to be recessed and a diameter thereof is gradually decreased toward the interior of the lens.

* * * * *